United States Patent [19]

Kinn et al.

[11] Patent Number: 4,973,382

[45] Date of Patent: Nov. 27, 1990

[54] FILTRATION FABRIC PRODUCED BY WET LAID PROCESS

[75] Inventors: Larry L. Kinn, Northumberland, Pa.; Bruce A. Perry, Holleston; Peter Lerner, North Attleboro, both of Mass.

[73] Assignee: International Paper Company, Purchase, N.Y.

[21] Appl. No.: 224,420

[22] Filed: Jul. 26, 1988

[51] Int. Cl.$^5$ .............................. D21H 13/12
[52] U.S. Cl. .................. 162/146; 162/168.1; 162/184; 162/186; 210/504; 210/506; 210/508
[58] Field of Search .............. 162/146, 135, 184, 186, 162/168.1; 210/504, 506, 508

[56] References Cited

U.S. PATENT DOCUMENTS

| | | | |
|---|---|---|---|
| 2,885,084 | 5/1959 | Rocca | 210/464 |
| 2,971,907 | 2/1961 | Smith | 210/504 |
| 3,158,538 | 11/1964 | Pall et al. | 162/146 |
| 3,307,706 | 3/1967 | Taylor | 210/504 |
| 3,386,231 | 6/1968 | Nutting | 162/146 |
| 3,573,158 | 3/1971 | Pall et al. | 162/146 |
| 3,622,446 | 11/1971 | Burnham | 162/146 |
| 3,674,621 | 2/1970 | Miyamoto et al. | 162/146 |
| 3,753,826 | 8/1973 | Plummer | 162/146 |
| 4,007,083 | 2/1977 | Ring et al. | 162/146 |
| 4,081,318 | 3/1978 | Wietsma | 162/157 R |
| 4,496,583 | 1/1985 | Yamamoto et al. | 428/288 |
| 4,529,481 | 7/1985 | Yoshida et al. | 162/157.3 |

FOREIGN PATENT DOCUMENTS 753931 12/1970 Belgium .............................. 162/146
787649 6/1968 Canada ................................. 162/146

OTHER PUBLICATIONS

B. P. Thomas and R. Kebea, "Filtration Properties of Wet-laid polyester nonwovens," Nov. 1988, TAPPI Journal.
"Wet Laid Nonwoven Fabrics for Filtration Applications," Oct. 1988, Nonwovens Industry.

*Primary Examiner*—Peter Chin
*Attorney, Agent, or Firm*—Francis J. Clark

[57] ABSTRACT

A nonwoven filtration fabric is composed of a plurality of fiber components of dissimilar denier and length which are evenly intermingled and bonded together in a sheet, including a first fiber component of staple polyester fibers of high denier and a textile length, a second fiber component of staple polyester fibers of low denier and shorter length than the first fiber component, a third fiber component of wood pulp fibers of shorter length than the first fiber components, and a suitable binder. The fabric is formed by a wet laid process in which the dissimilar fiber components are evenly mixed and distributed in a homogeneous slurry. A filter media made of the fabric has a high tensile strength, even pore size and distribution, low pressure drop, and is suitable for macrofiltration applications, such as filtering milk.

5 Claims, 3 Drawing Sheets

FILTRATION FABRIC PRODUCED BY WET LAID PROCESS

FIELD OF THE INVENTION

This invention generally relates to a nonwoven fabric for use in filtration of food and non-food liquids, and more particularly, to a filtration fabric produced by a wet laid forming process from a composite of long and short staple fibers and wood pulp fibers.

BACKGROUND ART

Nonwoven fabrics suitable for filtration of liquids are well known in the prior art. Typically, filtration pads, socks, or tubes are formed from a surface bonded or binder-impregnated sheet of nonwoven fibers. The filter sheet is fabricated to have a porosity for filtering sediment and other contaminant particles from a liquid, for example, as is done for raw milk from a dairy farm. It is generally desired that such filtration fabrics have good wet strength over prolonged use, have consistent pore size, provide effective filtration at a normal flow speed (low pressure drop) through the filter, and be economical to manufacture.

Nonwoven filtration fabrics have been made of cellulosic fibers, but such fibers swell in water and tend to weaken or collapse in use. Crimped rayon fibers have been added to strengthen the fabric, but the resiliency of the fibers under wet process conditions has not been satisfactory. In order to improve the characteristics of the filter fabric, various blends of fibers have been used.

For example, in U.S. Pat. No. 2,971,907 to Smith, glass monofilament fibers are blended with fine inorganic fibers, such as asbestos or glass fibers, and impregnated with a binder. In U.S. Pat. No. 3,307,706 to Taylor, cellulosic fibers of low denier are blended with polymeric fibers of a high wet stiffness, and impregnated with a binder. It is known that of the various nonwoven sheet forming processes, a wet forming process is the most beneficial for industrial production of nonwoven sheets made of polymeric fibers. However, the resultant filter fabrics are still considered not fully satisfactory in mechanical strength, surface quality, uniformity of fiber, filtration effectiveness, and/or durability.

A recent development, as disclosed in U.S. Pat. No. 4,496,583 of Yamamoto et al., is a polyester fiber sheet made by a wet sheet-forming process from drawn, uncrimped polyester staple fibers of low denier (0.9 or less) and short length (15 mm. or less), alone or combined with undrawn polyester of low denier and short length and a small amount of other staple fibers. The polyester fibers of low denier are used to avoid frequent breakage during the wet forming process, undesirable fluffs and stiffness, and poor mechanical strength. The short length is used to avoid poor dispersal of the staple fibers in water when they become entangled with each other. However, filter sheets formed of the low denier, short length polyester fibers have the disadvantages of small pore size and high pressure drop through the filter, making them unsuitable for filtering larger particles (over 2 microns) at normal flow rates, such as for filtering milk.

Accordingly, it is a principal object of the invention to provide an improved nonwoven filtration fabric having the desired properties of high strength, uniformly distributed pores, low pressure drop, good filtering properties, and suitability for macrofiltration.

A further object of the invention is to manufacture a nonwoven filtration fabric with high productivity, consistency and quality using a wet sheet forming process.

DISCLOSURE OF THE INVENTION

In accordance with the present invention, a nonwoven filtration fabric is composed of a plurality of fiber components of dissimilar denier and length which are evenly intermingled and bonded together in a sheet, including a first fiber component of staple polymeric fibers of high denier and a textile length, a second fiber component of staple polymeric fibers of low denier and shorter length than the first fiber component, a third fiber component of a fibrous filler of shorter length than the first fiber component, and a suitable binder. The properties and proportions of the fiber components are chosen to produce a filter fabric of controlled density, desired pore size, even pore distribution, and thickness.

A preferred filtration fabric of the invention is formed from 30–60% staple polyester fibers of 15 denier and 1.5 inch (38 mm.) length, 30–65% staple polyester fibers of 1.5 denier and 0.5 inch (13 mm.) length, 5–25% bleached craft pulp fibers, and an acrylic polymer binder. The preferred fabric has a statistical distribution of pore size ranging from approximately 20–80 microns, a mean pore size of approximately 50 microns, and approximate machine and cross direction wet tensile strength of 20–35 and 7–12 lbs./in.-width, respectively.

A preferred process for forming the filtration fabric of the invention comprises preparing a homogeneous slurry of water and the fiber components of dissimilar denier and length evenly distributed therein, transferring the slurry to a wet laid forming machine and removing the water from the slurry through a porous web to form a wet mat or sheet, applying a binder to the wet sheet, and drying the binder-impregnated wet sheet with sufficient heat to remove the water and cause polymerization and bonding together of the fibers. The wet laid forming process results in a product of high strength and the desired filter properties, and allows high productivity in manufacturing in the range of 140–200 ft./min. for fabrics of 60–100 inches width and up to 100 gms./sq.ft. fabric weight.

Other objects, features, and advantages of the present invention will be apparent from the following detailed description of the best mode of practicing the invention when considered in conjunction with the drawings, which should be construed in an illustrative and not limiting sense, as follows:

BEST MODE OF CARRYING OUT THE INVENTION

Figure 1:
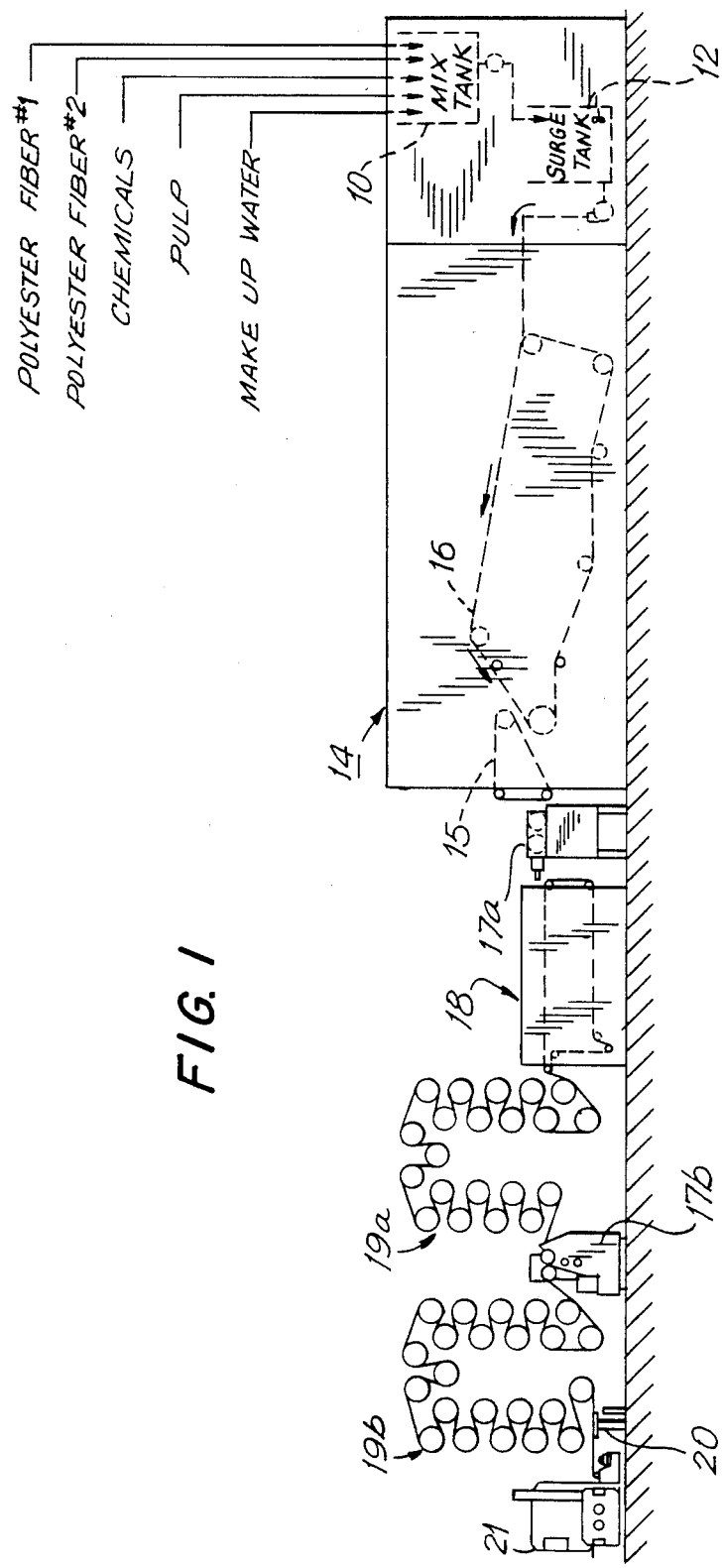
FIG. 1 is a schematic illustration of a production apparatus for producing the nonwoven filtration fabric in accordance with the invention.

The nonwoven filtration fabric of the invention is primarily intended to be used to form filter socks or tubes for filtering sediment and larger sized particles (macrofiltration) from a liquid medium. One particular application is the filtering of raw milk transferred by gravity flow or pump action from milking devices to a cooling and storage tank. Examples of preferred fabric compositions and forming process suitable to form filters for filtering milk are described herein. However, it is to be understood that such application and given examples are intended only to be illustrative, and not limiting, of the principles of the invention.

Referring to the drawings, a nonwoven filtration fabric is formed by the wet laid forming process from a plurality of synthetic or natural polymeric fiber components of dissimilar denier and length. The fiber blend includes a first fiber component of staple polymeric fibers of high denier and a textile length, a second fiber component of staple polymeric fibers of low denier and shorter length than the first fiber component, and a third fiber component of a fibrous filler of shorter length than the first fiber component. The fiber components are evenly distributed and intermingled in sheet form and bonded together with a binder.

Suitable polymeric fibers for use in the invention include synthetic polyesters, such as methylene terephtalate and ethylene terephtalate, acrylic fibers, and natural rayon, cellulose acetate, and cotton fibers. The fibrous filler component may include wood pulp or cotton dust.

The longer, polymeric fibers of textile length generally have a length greater than 0.5 inch to 1.5 inch or longer. At least one other component of polymeric fibers have a shorter length than the longer polymeric fiber. The fibrous filler fibers have a short length of 0.5 inch or less. The denier number corresponds to the weight-per-unit-length of the fiber, and ranges from 1.0 to 15 deniers for the polymeric fiber components of the invention.

Figure 2A:
FIG. 2A is a photograph at 100X magnification of the pore formation of a filtration fabric of the invention.

A preferred filtration fabric of the invention is formed from staple polyester fibers of 15 denier and 1.5 inch (38 mm.) length, staple polyester fibers of 1.5 denier and 0.5 inch (13 mm.) length, and 5–25% bleached craft pulp fibers. As illustrated in FIG. 2A, the longer length, high denier fibers 30 (larger cylinders) are used to form a reticulated structure creating larger pores in the fiber mat. The shorter length, low denier fibers 31 (smaller cylinders) intersect through the pores of the higher denier fibers forming a randomized distribution of smaller pore openings and a large number of crossover points. The bleached craft pulp fibers 32 (twisted fibrils) provide intricate fluid passages through the mat and form the final pore size and distribution.

A preferred polyester fiber is Hoechst-Celanese T109 polyester, made by Hoechst-Celanese Fibers Company, Charlotte, N.C. A preferred pulp fiber is Acetakraft First Quality pulp, made by International Paper Company, Purchase, N.Y.

A binder coating is applied to the fibers during the wet laid forming process. The large number of crossover points of the distributed and intermingled fibers adds to the strength of the fabric. It will be recognized that the binder should be non-water-soluble and have an affinity to the component polymeric and filler fibers in the fabric. A preferred binder is Acrylic polymer type 26084, manufactured by B.F. Goodrich, Cleveland, Ohio, which has good bonding affinity to both polyester and cellulosic fibers, and provides good wet tear resistance both in the machine and in the cross-fabric directions. Good tear resistance is particularly needed in the wet stages of pressure filtration, which has intermittent cycles of start and stop filtration going from zero to 25 psi, and commonly operates at 15–25 psi.

The combination of the three fiber components of dissimilar denier and length produces an even distribution of pores, controlled pore dimensions, high flow rate (low pressure drop), and effective retention of targeted contaminant particles. Examples of fabrics produced in the preferred fiber composition ranges are given below. The resulting fabrics have a statistical distribution of pore sizes ranging from approximately 20–80 microns, a mean pore size of approximately 50 microns, and approximate machine and cross direction wet tensile strength of 20–35 and 7–12 lbs./in.-width, respectively.

WET LAID FORMING PROCESS

A generalized wet laid forming process for producing the above-described fabric will now be described with reference to the generalized production line illustrated in FIG. 1. The wet laid process begins with stock preparation to make an evenly dispersed mixture of the polymeric and filler fibers. The polymeric fibers are opened (separated) and dispersed with the pulp fibers in a mix tank 10. Dispersion of the polymeric fibers can be aided by chemical addition of pH adjustment or viscosity modifiers to promote and maintain fiber separation. Wetting agents can also be employed to facilitate dispersion of the hydrophobic fibers. The mix tank 10 is equipped with an agitator which provides the shear energy required to effect good fiber separation and dispersion throughout the mix volume.

The pulp fibers are opened separately and added to the mix tank 10. Typically, wood fiber is received in sheet form called dry lap. These sheets are broken up in a slurry tank fitted with a rotor, then the wood fiber slurry is passed through a refiner, which provides a mechanical action analogous to brushing the surface of the fiber to raise fibrillated tiny tendrils. These tendrils provide mechanical entanglement and hydrogen bonding sites for bonding to one another.

The water, chemicals, and fibers are added to the mixing tank 10 in controlled amounts to obtain a desired stock consistency. From an operational point of view, thicker stock consistencies are desirable to minimize preparation time and save on chemical usage. The consistency level should be chosen so that the forming process can be operated at its optimal speed for a particular grade of fabric.

With the completion of the stock preparation, the thick stock furnish is transferred to a holding or surge tank 12, so that the next batch of stock can be prepared. The surge tank 12 is equipped with an agitator to keep the thick stock uniformly mixed. The surge tank 12 meters stock into a web forming machine 14, which may be of the type known as a Fourdenier or a Rotoformer. The stock is fed to a head box 15 in the forming machine 14 where it is diluted with water to a lower consistency and brought to a forming zone of an endless wire (mesh) 16 moving in the machine direction.

In the forming zone, water from the diluted stock applied to the wire 16 is drawn through the wire, leaving behind the fiber mat or sheet. The drained water is then recirculated through a primary water circuit. The fiber mat is then transferred out of the forming machine 14. A press section may follow the forming machine to remove additional water from the mat as well as consolidate the web.

The binder is added to the formed web by any one of several methods, including foamed emulsion, gravure roll polymer emulsion, spraying, or padding and nip-pressure binder pick-up. In FIG. 1, first and second padders 17a, b are shown as the binder applicator. The binder is preferably added in an amount of 20-35% based on dry fabric weight.

The binder-impregnated sheet is then dried through a drying section, which may include air convection driers, steam heated dry cans, or radiant heat from infrared heat panels. An infrared unit 18 and two dry can sections 19a, b are shown in FIG. 1. The heat sources are located at a distance from the fabric to control the surface temperature of the mat. Sufficient heat is applied to remove the water from the binder emulsion and cause binder polymerization and bonding together of the fibers. The dried mat passes through a weight sensor section 20, and is then wound by a winder section 21 in continuous roll form. Additional treatment or finishing of the sheet can follow off line. The filter sheet is then used as a base stock fabric for filter socks, tubes, disks, or sheets.

The wet laid forming process allows high productivity in manufacturing. Production rates of about 140-200 ft./min. have been obtained for fabrics of 60-100 inches width and 60-100 gms./sq.ft. fabric weight. The desired tensile strength and filtration properties of the fabric product are integrally obtained as a result of the wet forming process. A preferred range of dry fabric weight for filtration fabric produced by this process is 60-110 gms/sq.yd.

Other binders which can be used in the wet forming process, which are suitable for filter media for liquid form food and beverages, include: polyvinyl acetate, methyl and/or ethyl acrylate homopolymers and copolymers; and styrene-butadiene copolymers with and without cross-linking elements, such as ureaformaldehyde and melanine-formaldehyde in ratios of from zero to 10 parts per hundred of dry binder polymer.

Figure 2C:
FIG. 2C is a photograph further showing particles retained by surface filtering.
Figure 2B:
FIG. 2B is a photograph at 100X magnification of particles retained by entanglement on the surface of the filtration fabric of FIG. 2A.
Figure 2F:
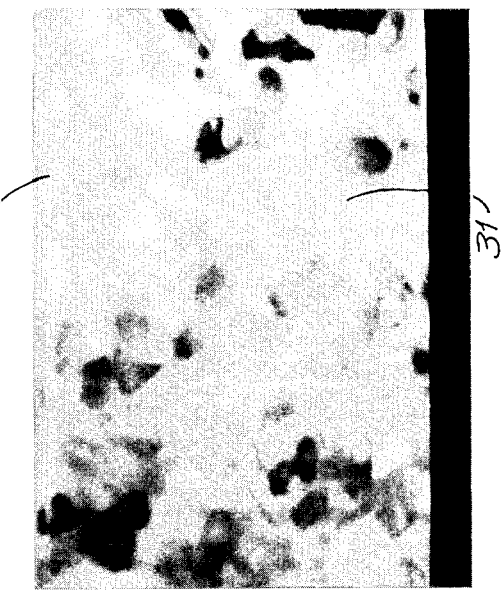
FIG. 2F is a photograph further showing particles retained by filtering in deep layer locations.
Figure 2D:
FIG. 2D is a photograph further showing particles retained by filtering at surface and intermediate layers.
Figure 2E:
FIG. 2E is a photograph further showing particles retained by filtering at middle layers.

The nonwoven filtration fabrics intended for use as a milk filter are designed to provide "surface" or "cake" filtration on the outer layers of the filter, as shown in FIGS. 2B and 2C. The surface filtration removes particles and soil contaminants of larger size, in the range of 1/16 to ⅛ inch or larger, such as twigs, grass, soil contaminants, and animal wastes. On the other hand, the inner layers of the filter provides "depth" or "blocking" filtration by the passage of the liquid through the intricate network of pores through the thickness of the fabric. This removes contaminants of smaller size, i.e. 100 microns or smaller, which become attached to the surfaces of the fibers by adhesion or mechanical forces, as illustrated in FIGS. 2D, 2E, and 2F.

The high liquid permeability of the preferred fabric having the above-described long polyester fibers of high (15) denier allows a normal and continuous flow of milk through the filter. The proportion of high (15) and low (1.5) denier fibers, and the wood pulp fibers, provide a depth filtration media having a large internal filtration area which allows large volumes of fluid to flow through the filter without producing an excessive pressure drop across the filter which may cause back-up of the fluid and interruption of the filtration process.

The following examples are illustrative of nonwoven filtration fabrics having the blend of fibers of dissimilar length and denier in accordance with the invention:

EXAMPLE 1

| Fiber Blend: | 15 denier, 1.5 inch, staple polyester | 50% |
| --- | --- | --- |
| | 1.5 denier, 0.5 inch, staple polyester | 30% |
| | Acetakraft wood pulp | 20% |
| Binder: | Acrylic type 26084, 35% of dry fabric weight | |

The physical properties of fabric of the above composition were measured for the fabric produced according to the wet laid forming process, and compared to one produced by a dry laid forming process, as shown in the following Table I.

TABLE I

| | Wet Laid | Dry Laid |
| --- | --- | --- |
| Dry Fabric Weight (gms/sq. yd.) | 60-110 | 60-110 |
| Thickness (mils) | 22-30 | 20-28 |
| Tensile Strength (lbs/in.-width) | | |
| Dry, machine direction | 28-42 | (Not Available) |
| Dry, cross direction | 9-14 | (Not Available) |
| Wet, machine direction | 20-35 | 10-16 |
| Wet, cross direction | 7-12 | 6-8 |
| Mullen Burst Test, Wet (psi) | 70-110 | 30-60 |
| Flow Time (seconds) | 18-26 | 20-27 |
| Retention (%) | 75-85 | 65-80 |

For the tests in Table I, a controlled contaminant was used in the form of Norton abrasive grit, type 240, manufactured by Norton Abrasives Company, Worcester, Mass., having an average particle size of 55 microns and range of 35 to 75 microns. The flow time test refers to the time in seconds it took to filter 5 gallons of water contaminated with 5 grams of the Norton grit 240 at ambient temperature through a 6.5 inch diameter filter specimen. The retention test refers to the amount of grit particles retained by the filter specimen.

The test results show that the filtration fabric of the invention provides a high contaminant retention capacity as well as faster flow times considered normally desirable for macrofiltration applications such as milk filtering. The comparative test results of wet to dry forming show that the fabric produced by the wet laid process had a significantly higher Mullen Burst strength and far superior tensile strength under wet filtration conditions, as well as better retention capacity.

Examples of fabrics having other proportions of the three preferred fiber components are given in Table II below:

TABLE II

| | 15 Denier | 1.5 Denier | Wood Pulp |
| --- | --- | --- | --- |
| Example 2: | 40% | 40% | 20% |
| Example 3: | 45% | 40% | 15% |
| Example 4: | 30% | 50% | 20% |
| Example 5: | 25% (1.5")<br>25% (0.75") | 30% | 20% |

The above Examples 2-5 of filtration fabrics having the three fiber components in proportions within the ranges of the invention were found to have comparable properties to Example 1 above.

The invention thus provides an improved nonwoven filtration fabric having the desired properties of high strength, controlled pore size, low pressure drop, good filtering properties, and suitability for macrofiltration. The fabric produced by the wet laid forming process has superior properties to one produced by the dry forming process. The wet laid forming process also allows manufacturing of a high productivity, consistency and quality.

Numerous variations of the fiber component types and proportions are of course possible in light of the above disclosure. For example, although the preferred embodiments employ staple polyester fiber, other types of natural or synthetic fibers may be used if they have significantly dissimilar deniers and lengths, which allow the effects provided in the invention to be obtained.

Although the invention has been described with reference to certain preferred embodiments and process modes, it will be appreciated that other variations of structures, products, and processes may be devised, which are nevertheless considered to be within the spirit and scope of the invention as defined in the claims appended hereto.

We claim:

1. A nonwoven filtration fabric comprising first, second and third fiber components of dissimilar denier and length which are evenly intermingled and bonded together in a sheet, and a suitable binder, wherein said first fiber component is 30-60% staple polymeric fibers of 15 denier and 1.5 inch length, said second fiber component is 30-65% staple polymeric fibers of 1.5 denier and 0.5 inch length, and said third fiber component is 5-25% fibrous filler.

2. A nonwoven filtration fabric composed of a plurality of fiber components of dissimilar denier and length which are evenly intermingled and bonded together in a sheet, including a first fiber component of 30-60% staple polyester fibers of 15 denier and 1.5 inch length, a second fiber component of 30-65% staple polyester fibers of 1.5 denier and 0.5 inch length, a third fiber component of 5-25% bleached kraft pulp fibers of 0.5 inch length or less, and an acrylic polymer binder.

3. A nonwoven filtration fabric according to claim 2, wherein said fabric has a statistical distribution of pore size ranging from approximately 20-80 microns, and a mean pore size of approximately 50 microns.

4. A nonwoven filtration fabric according to claim 2, wherein said fabric has approximate machine and cross direction wet tensile strength of 20-35 and 7-12 lbs./in.-width, respectively.

5. A wet laid process for forming a nonwoven food filtration fabric comprising the steps of:
   (a) preparing a homogeneous slurry of water and a plurality of fiber components of dissimilar denier and length wherein the fiber components are evenly distributed and intermingled, including a first fiber component of 30-60% staple polymeric fibers of high denier and a textile length, a second fiber component of 30-65% staple polymeric fibers of low denier and shorter length than the first fiber component, and a third fiber component of fibrous filler of shorter length than the first fiber component;
   (b) transferring the slurry to a wet laid forming machine and removing the water from the slurry through a porous forming wire mesh to form a wet fibrous mat or sheet;
   (c) applying a suitable binder in an emulsion or foam form to the wet sheet; and
   (d) drying the binder-impregnated wet fibrous sheet with sufficient heat to remove the water from the binder emulsion and cause polymerization of the binder and bonding together of the fibers,
   wherein said first fiber component is staple polymeric fibers of 15 denier and from 0.75 to 1.5 inch length, and said second fiber component is staple polymeric fibers of 1.5 denier and 0.5 inch length.

* * * * *